United States Patent [19]
Cornu

[11] 3,985,042
[45] Oct. 12, 1976

[54] ROTARY MECHANICAL AMPLIFIER OR SWITCHING DEVICE

[75] Inventor: Charly Cornu, Einigen, Switzerland
[73] Assignee: Etel S.A., Saint-Sulpice, Switzerland
[22] Filed: May 8, 1975
[21] Appl. No.: 575,963

[30] Foreign Application Priority Data
May 21, 1974 Switzerland............. 7091/74

[52] U.S. Cl. .................. 74/568 R; 74/53; 74/568 M
[51] Int. Cl.² ......................... F16H 53/00
[58] Field of Search.......... 74/568 M, 568 T, 568 R, 74/54, 53; 200/38 C, 38 CA

[56] References Cited
UNITED STATES PATENTS

| | | | |
|---|---|---|---|
| 2,020,877 | 11/1935 | Coolidge | 74/568 M |
| 2,909,626 | 10/1959 | Enssle | 74/568 M |
| 3,475,987 | 11/1969 | Henebry | 74/568 |
| 3,506,970 | 4/1970 | Templeton | 74/568 X |

*Primary Examiner*—Samuel Scott
*Assistant Examiner*—F. D. Shoemaker
*Attorney, Agent, or Firm*—Haseltine, Lake & Waters

[57] ABSTRACT

A rotary mechanical amplifier for rapidly switching a controlled member between two positions, which comprises a rotary drum carrying a series of cylindrical rods regularly spaced in circular configuration about the axis of rotation of the drum. Each rod is selectively slidable axially between two positions in response to control signals, for example by means of electromagnetically controlled sprung bolts or catches. In one axial position, the rods tangentially engage a curved surface of a lever or other controlled member to move it to a position where it can be held without vibration by tangential engagement with successive rods.

10 Claims, 13 Drawing Figures

ROTARY MECHANICAL AMPLIFIER OR SWITCHING DEVICE

The invention concerns mechanical amplifying or switching devices which enable setting and holding according to a control signal of the all-or-none positions of a mechanical part or member.

Known devices for generating this type of movement, involving transition phases and holding phases, do not enable strict dynamic constraints to be satisfied.

Mechanical, hydraulic and pneumatic jacks produce large forces and lend themselves to holding, but are of more or less slow operation.

Electromagnetic friction clutch devices enable generation of very rapid movements if the driven members only have a small resistance to movement and, in principle, are light, since an increase in the couple or force transmitted leads to an increase in the time of magnetization, hence in the reaction time.

For members with a given inertia, the generation of rapid movements thus requires the use of mechanical devices which alone can transmit a high specific energy.

Mechanical friction clutches are only advantageous if the control signal is directly supplied in a mechanical form with a sufficient energy.

Self-engaging friction clutches, meshing clutches or simple spring catches generate shocks which are only acceptable for slow or light movements.

Shockless spring-catch devices are suitable for rapid and heavy movements. However their operation generally depends on a geometrical synchronizing arrangement which gives them a veriable reaction time, incompatible with certain applications.

It should be noted that to provide holding phases, clutches and spring catches must be combined with auxiliary devices such as stops or bolts.

An object of the present invention is to provide a mechanical switching device enabling a shock-free, powerful and rapid transitional movement with a well determined reaction time, and operable by a low energy signal.

According to the invention, there is provided a rotary mechanical amplifier or switching device comprising a rotatable disc-like support, a member mounted for movement in a plane parallel to the support between a first position and a second position; a plurality of rods carried by the support for rotation therewith, the rods being disposed parallel to the axis of rotation of the support and being regularly spaced apart from one another in a circular configuration concentric to the axis, each rod being axially slidable relative to the support between a first position out of said plane and a second position in which a cylindrical part of the rod intercepts the plane. The member has a surface for tangential engagement with rods in their second position to move the member from its first to its second position or to hold the same in its second position in response to rotation of the support; and means for selectively moving the rods between their first and second positions.

Preferred embodiments of the invention will now be described in detail, by way of example, with reference to the accompanying drawings, in which.

Figure 1:
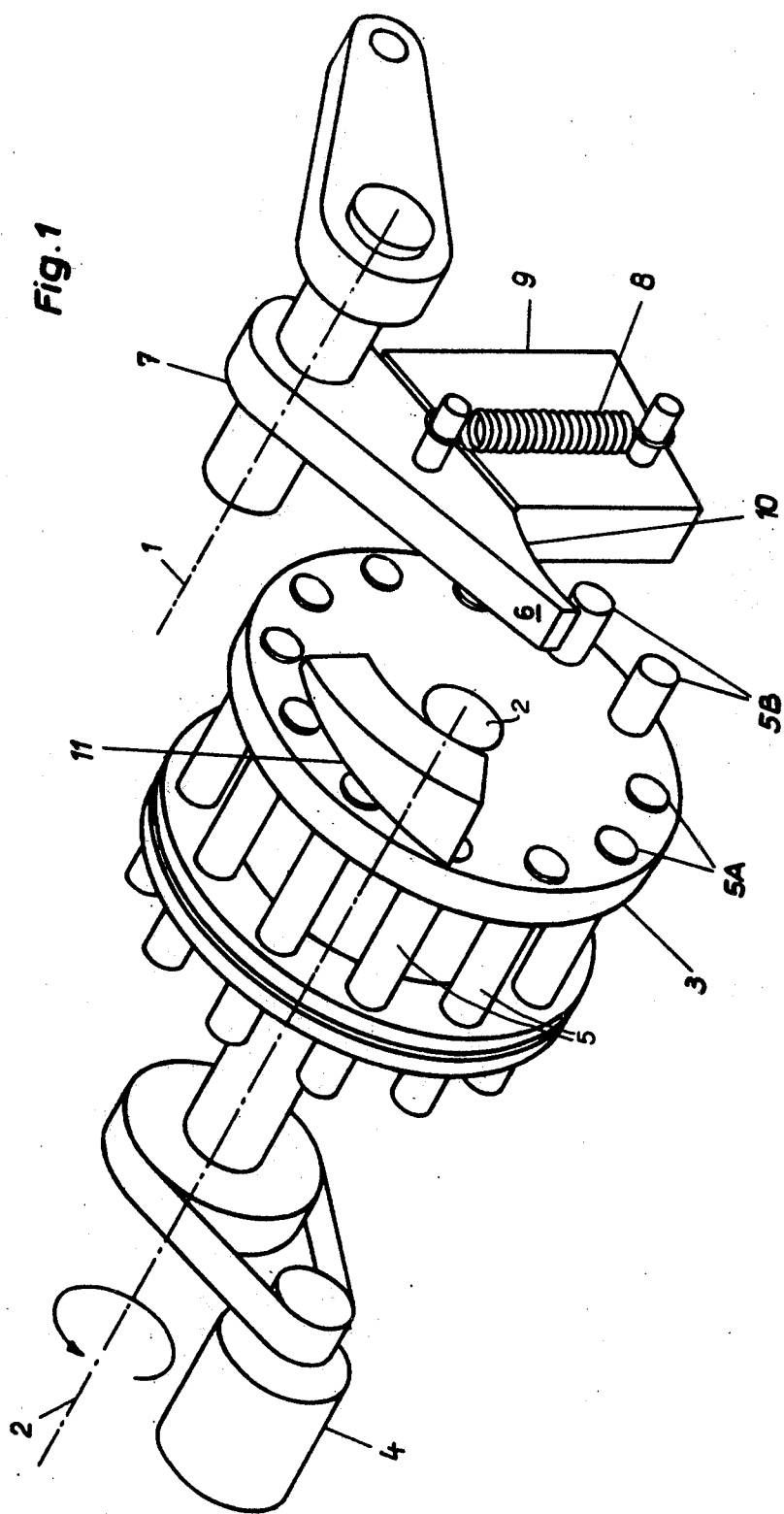
FIG. 1 is an overall perspective view of the main parts of a switching device according to the invention.

As shown in FIG. 1, a controlled shaft 1 and a driving shaft 2 are rotatably mounted parallel to one another on a chassis or casing, not shown. A composite driven disc or support 3, formed of two circular plates mounted on the driving shaft 2, is continuously rotated by a motor 4. Cylindrical rods 5 are slidably mounted in axial bores of the disc 3, between axial positions as shown at 5A and 5B, and are regularly spaced-apart in circular configuration concentric to the axis of shaft 2. A lever 7 is fixed on shaft 1 for pivotal movement flush with one face of disc 3, and has at its free end 6 a curved surface 10 which, when a rod in the position 5B protrudes from the face of the disc 3, engages and is driven by the protruding rod.

The take-up of lever end 6 by a rod 5 is tangential, hence shock-free, as the extremity of the curved surface 10 of end 6 is parallel to the trajectory of the innermost part of rods 5 at the initial point of contact. Lever 7 is held with end 6 in this initial position by a spring 8 biasing the lever against a stop 9, thus defining a rest position of the controlled shaft 1.

When several consecutive rods protrude in position 5B from the operative face of disc 3, the lever 7 is driven by the first protruding rod 5, then held in a position by the following protruding rod, in which the surface 10 is concentric to a circle at the outer periphery of the rods, the surface 10 having a length sufficient for two consecutive rods in position 5B to simultaneously engage therewith and thus hold it without vibration.

When the lever 7 is no longer held by the rods, the spring 8 returns it to the initial position. An absorber can be provided to damp impact of the lever 7 against stop 9.

The selection and the holding of lever 7 in either of its positions depends on the axial position 5A or 5B of the rods 5 in the engaging sector.

Positioning of the rods can be carried out in various manners according to the nature of the control signal.

A mechanical control signal may, for example, engage or withdraw an inclined plane in or from the trajectory of the non-operative end of the rods protruding from the other face of the disc. The control energy need only ensure movement of the inclined plane, the energy required for axial movement of the rods being supplied by rotation of the driven disc.

A fixed inclined plane or cam, such as 11 in FIG. 1, disposed after the engaging sector, bears against the operative ends of the rods in position 5B and, by the rotational movement of the disc 3, places them back into position 5A.

Figure 2:
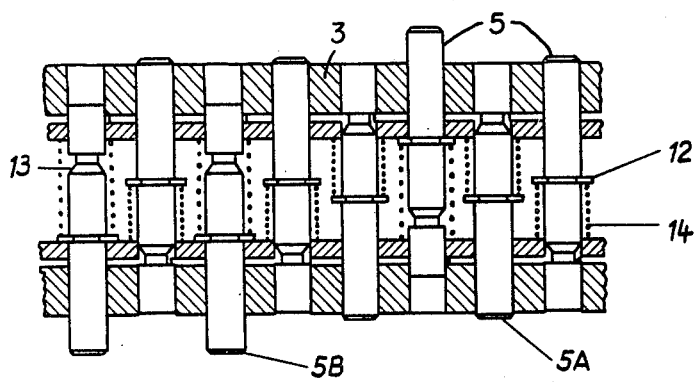
FIG. 2 is a schematic view of a double-faced disc, showing successive rods.
Figure 3:
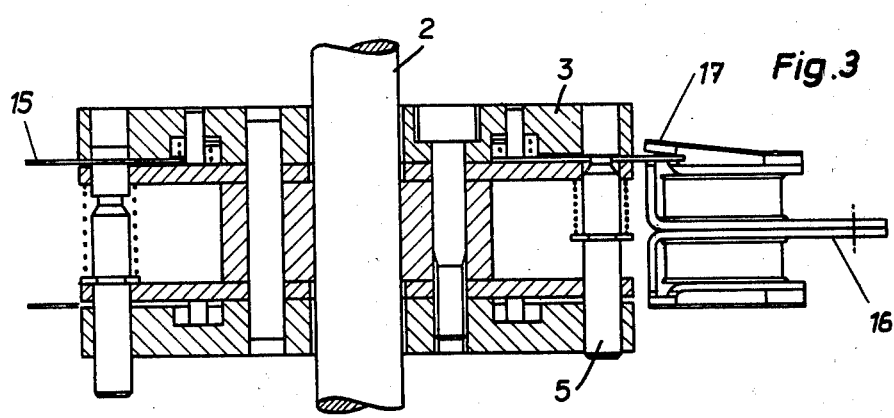
FIG. 3 is an axial cross-section of the disc of FIG. 2, and a control device.
Figure 4:
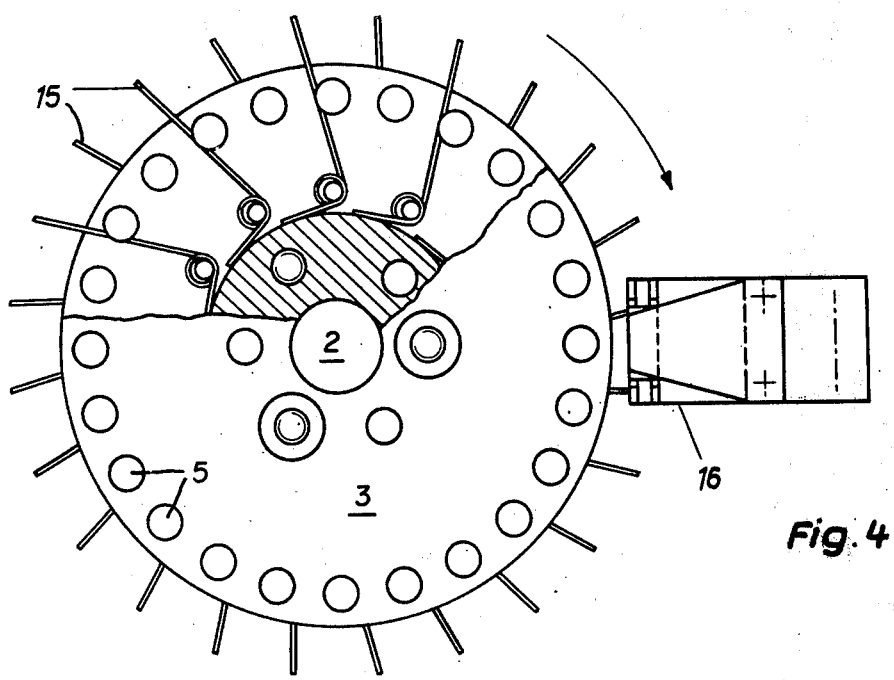
FIG. 4 is a side elevation corresponding to FIG. 3.

FIGS. 2 to 4 show a particular arrangement of a disc or support 3 with two operative faces and two independent series of alternate rods 5, and a device for positioning the rods, suitable for rapid rates of operation and low-energy control signals.

The rods 5 each have a rim 12 and a groove 13. Each rim 12 serves to support a compression coil spring 14 and also as an end-of-path stop for the engaging rod position 5B. The groove 13 enables each rod 5 to be held in position 5a by a sprung bolt 15 which automatically engages therein when, by means of a fixed inclined plane (such as cam 11 of FIG. 1), the rod is returned to its position 5A. The bolt 15 may be a lock or a lock blade (see FIGS. 3, 5).

The bolts 15 are preferably, as shown, formed of suitably shaped spring wires. To free a rod 5 in position 5A, it suffices to place an obstacle in the trajectory of the end of its bolt 15. The latter is driven by the rotational movement of the disc 3, bends and disengages from the groove 13, and the spring 14 moves the rod from position 5A to 5B.

The ends of the bolts 15 pass through and air-gap of an electromagnetic catch 16 of which an armature 17 is normally lifted up, as shown in the drawing. A small energization is sufficient to make the armature 17 adhere and obstruct the passage of bolts 15. As the electromagnet of this catch can be of very small dimensions, its magnetization time is short, which enables correct operation of the device, even at high rates of operation. A mechanical signal of small amplitude can also be used to control the device.

It is also possible to envisage a device for braking the bolts without material contact, for example by Foucault currents or magnetic attraction.

The described electromagnetic device for positioning the rods by detents and bolts, in addition to enabling a very low control current, positively defines the positions 5A and 5B of the rods 5, so that a partial engagement thereof is hardly possible.

The invention device for positioning the rods can also be used in an arrangement in which the locked rods engage lever 7, and the freed ones of the rods 5 do not engage the lever. In this case, the absence of an energizing current is considered as the application of a control signal.

To reduce wear produced by the engagement of the rods 5 on surface 10, rollers may be mounted at the operative ends of the rods, or the same can be designed so as to roll against surface 10.

Figure 5:
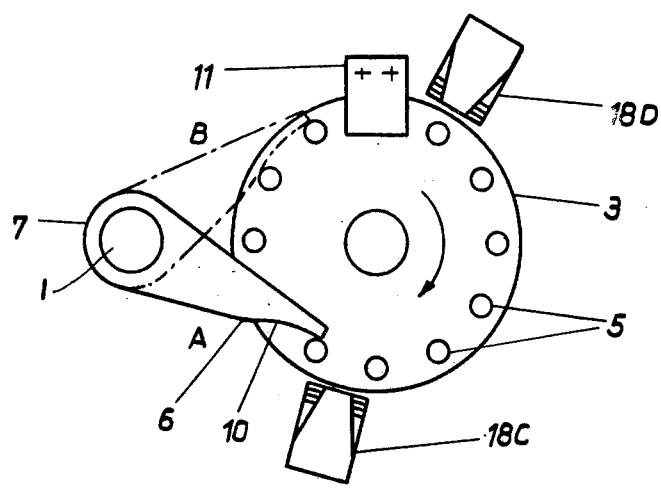
FIG. 5 is a schematic elevational view of the device of FIG. 1.

FIG. 5 schematically shows the device of FIG. 1 from the operative face of the driven disc 3 and the series of rods 5. Lever 7 with its end 6 and curved surface 10 is shown in full lines in an initial position A, and in chain lines in a position B, when it is driven or held by a protruding rod 5. An alternative form of fixed inclined plane 11 for replacing the rods in the initial position is shown.

The device for selectively positioning rods 5, such as the electromagnetic catch of FIGS. 3 and 4, is schematically shown at two different locations by 18C and 18D. At 18C, the reaction time of the device is minimum, whereas at 18D it is maximum, as the rods 5 controlled by 18D have to accomplish about half a turn before reaching the initial point of engagement with lever 7.

The "dispersion" of the reaction time depends upon the period of succession of rods 5. This dispersion is all the smaller the greater the number of rods. In the case of FIG. 5, it is equal to ¼ the time of transition of lever 7 from position A to position B.

Figure 6:
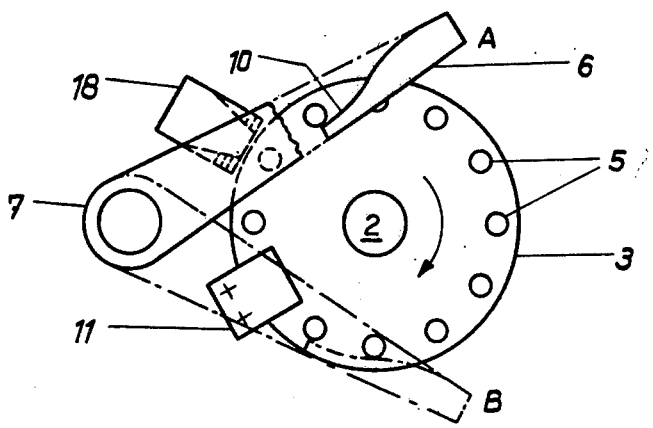
FIGS. 6, 7, 8 and 9 are views similar to FIG. 5 of four further embodiments.

FIG. 6, in which similar elements are designated by the same references, schematically shows a device similar to that of FIG. 5 but in which the sector of engagement is greater than 180°. This arrangement supplies a greater controlled coupled for the same force of engagement, has "softer" dynamic characteristics, but does not permit the maximum reaction time to be as long. The arrangement of FIG. 6 has a dispersion of the reaction time equal to one-eighth the time of transition of lever 7 from position A to position B.

Figure 13:
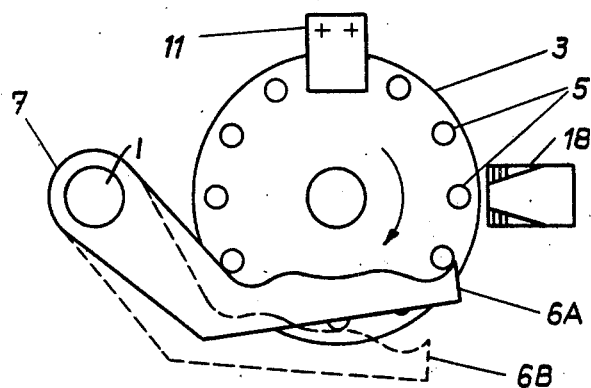
FIG. 13 is a schematic end elevational view of another embodiment.

A control device 18, e.g., electromagnetic in operation, is used in this modified embodiment of the inventive device in a manner similar to the earlier-described catch 16 (FIGS. 3, 4). The same device or catch 18 is also shown in FIGS. 8, 9 and 13.

Figure 8:
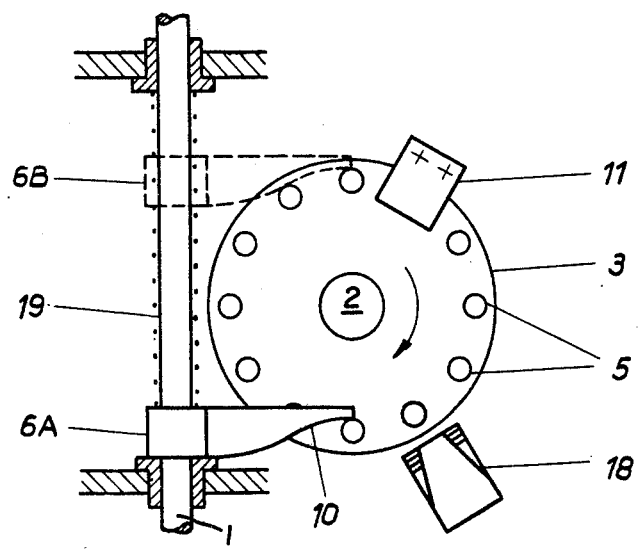
Figure 9:
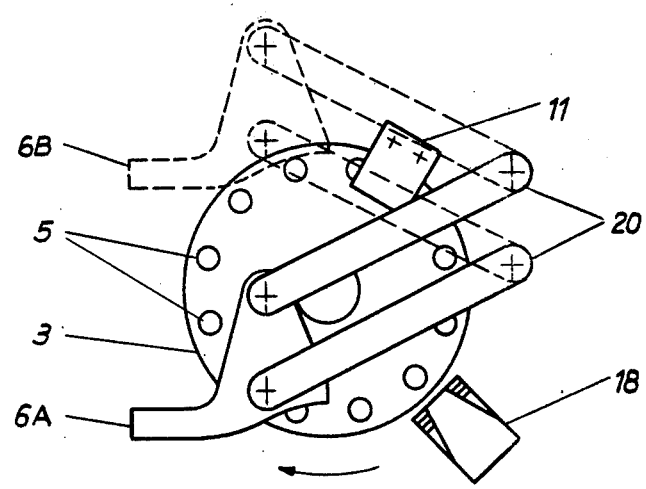

FIGS. 8 and 9 schematically show devices according to the invention having a sector of engagement of 180°.

In FIG. 8, a controlled member, similar to member 1 in FIG. 1, is shown at 6A and 6B in two positions. The curved surface 10 of the member is guided by a rail or slide 19 for a rectilinear parallel translational movement between the positions 6A and 6B.

In FIG. 9, the controlled member 6A (or 6B) is guided by a deformable parallelogram 20 for a parallel translational movement with a circular trajectory between the positions 6A and 6B.

Figure 7:
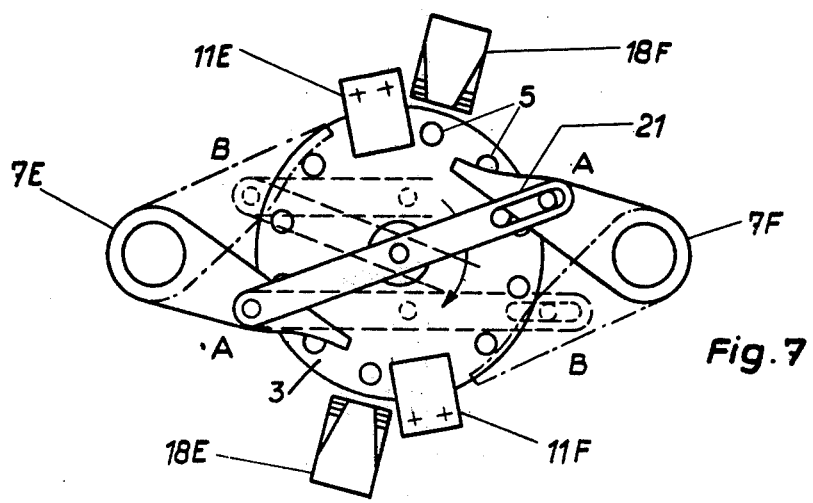

The devices of FIGS. 1, 6, 7, (to be described later) 8 and 9, associated with the rod-positioning device of FIGS. 3 and 4, are all-or-none mechanical amplifiers with monostable behavior. Their controlled member, in position A in the absence of a control signal, adopts position B upon appearance of the signal, remains in this position B as long as the signal continues, and moves back to position A, by spring action for example, upon disappearance of the signal (see positions 5A, 5B in FIGS. 1 and 2, or 6A, 6B in FIGS. 8 and 9).

These devices may operate as pulse generators. In this case, application of a control signal moves only one rod or a fixed and predetermined number of rods to always generate the same movement, independent of the duration of the signal. This may be achieved by a suitable rod-positioning device, with a time delay or locking bolt for example, or by an intermediate treatment of the control signal.

Two controlled members can be combined to form a bistable device. In this case, the application of a control signal produces a change of position, one of the controlled members providing the transition from position A to position B and the other from position B to position A. Holding in position A or B can take place by circulation of rods in the engagement position, or by an eccentric spring and stops for example.

Figure 10:
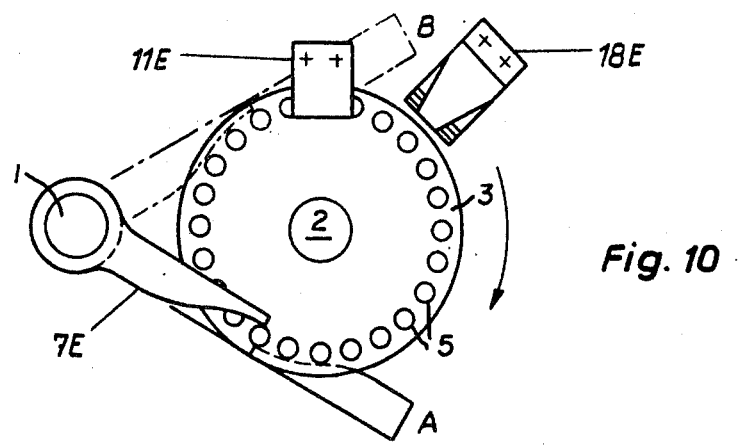
FIG. 10 is a similar elevational view of a further embodiment, in section along line 10—10 of FIG. 11.
Figure 11:
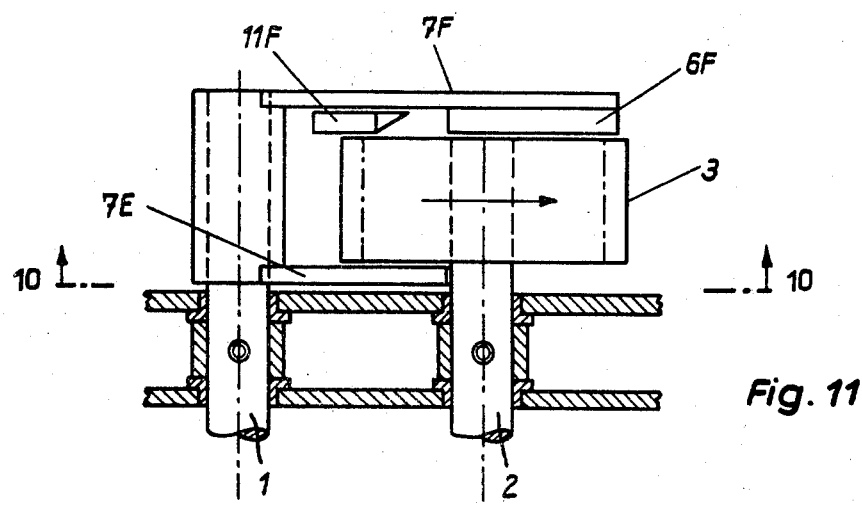
FIG. 11 is a top plan view, partly in cross-section, of the embodiment of FIG. 10.
Figure 12:
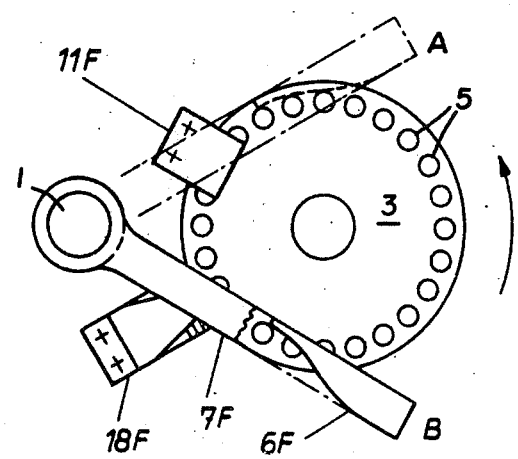
FIG. 12 is an end elevational view looking from above FIG. 11.

FIGS. 10 to 12 schematically show such a bistable device. In this particular arrangement, two tangential engagement devices, E and F (i.e., a lever 7E, cam 11E and control device 18E; and a lever 7F with an end 6F, a cam 11f and control device 18F) control the same shaft 1 using the same disc 3 with two operative faces and two independent series of alternate rods arranged as in FIGS. 2 to 4. A lock or other means controls the adequate distribution of control signals to 18E and 18F and avoids simultaneous or incompatible engagment.

A disc or support with two operative faces and a single series of rods meshing by either end also enables a bistable combination of two controlled members, but such a disc is incompatible with the arrangement of FIGS. 10 to 12.

These all-or-none mechanical amplifiers or switching devices can be combined with several accessories to form devices carrying out most logic functions, such as counters, adders, and so on.

For example, the combination of two tangential engagement devices as an adder may form a three-position amplifier. FIG. 7 shows a switching arrangement with two devices, such as levers 7E and 7F, with cams 11E, 11F and control devices 18E, 18F, using the same operative face of the disc 3.

It can be seen that either lever 7E, 7F can be brought into a position identified by the letter A, shown in full lines (downward in the drawing on the left-hand side for 7E, and upward on the right-hand side, for 7F), while the dot-dash positions B are in opposite direction. If the rotation of the disc 3 is considered, which is clockwise in the illustration, the positions A are against the rotation of the disc while the positions B coincide with the rotational direction.

A rigid bar 21, driven at its ends by the levers 7E, 7F, forms an adding accessory. The center of this bar can take three different positions, representing "0," "1," "−1," controllable by bringing the levers 7E, 7F into their positions A or B in respect to the other elements (e.g., cams 11E, 11F and control device 18E, 18F).

It follows that an output or position "0" can be obtained if both levers 7E, 7F are in the same A or B positions. If lever 7E is in the position B, while lever 7F is in the position A (that is, both levers upwards in FIG. 7), the output will be "1." Conversely, both downward positions, namely lever 7E in the position A and 7F in the position B, will result in a "−1" output.

In FIG. 13, the curved surface 10 of the controlled member 6A, 6B forms a special profile for tangential engagement with rods 5 in the extreme positions of the member. This Figure, which uses the same reference numbers to designate the same parts as before, shows an embodiment of a device with a modified form of lever 7 elbow shape, shown with its engaging end 6 in the initial position 6A in full lines and in deflected position 6B in dashed lines.

End 6 has a curved surface, as shown, the end of which engages tangentially with the outer periphery of the rods 5 in its position 6A, and a middle part of which engages tangentially with the outer periphery of rods 5 in position 6B, this middle part being disposed for tangential engagement with successive rods to enable holding of position 6B without vibration.

The favorable dynamic characteristics of the device of the invention result from the principle of operation and do not depend on precise manufacturing.

In the holding position, no power is dissipated, apart from rubbing. The transitional movements produced by engagement do not produce shocks either on the source of mechanical power, or on the controlled member.

These all-or-none mechanical amplifiers or switches are suitable for the driving of valves, obturators, distributors, deflectors, switching members, and so on.

They are in particular applicable in high output automatic sorting lines or machines. In such machines, the components of a mixture, if necessary divided into several parallel channels, are aligned, separated (possibly by acceleration) and delivered one-by-one to an identification device and to a distributor controlled by this identification device. The distributor physically separates the components of the mixture into several categories. If it is formed by one all-or-none amplifier or switching device controlling a direction switch, it permits separation into two categories. For separation into three or more categories, it is possible to envisage a combination in cascade of several of these simple distributors, or the combination as adder of several all-or-none amplifiers driving a multiple direction switch.

A monostable switching device according to the invention has been tested with success in a line for automatically sorting potatoes after picking. Components of a mixture of tubercules, stones, and clods of earth are delivered one-by-one to an identification device and to the distributor by a free fall, and the unwanted elements are intercepted during the fall. When the device controlling the distributing valve or deflector is equipped with the detent and bolt rod-positioning devices, an independent control of at least 15 complete movements per second can be achieved.

To increase the output of such a sorting line and guarantee the correct distribution of the components even if they are of different sizes, the time of opening of the valve or deflector may be controlled in such a manner that it is proportional to the size of the switched component.

What is claimed is:

1. A rotary mechanical switching device comprising: a rotatable disc-like support; a member mounted for movement in a plane parallel to said support between first and second positions; a plurality of rods carried by said support for rotation therewith, said rods being disposed parallel to the axis of rotation of said support and regularly spaced apart in a substantially circular configuration concentric to the axis of rotation; said rods being axially slidable relative to said support between a first position out of the parallel plane and the second position in which cylindrical parts of said rods intercept that plane; said member having a surface for tangential engagement with said rods in their second position, selectively to move said member from its first to its second position, and to hold said member in its second position in response to the rotation of said support; and means for selectively moving said rods between their first and second positions; wherein said surface of the member has a curvature which is concentric to a circle at the outer periphery of said cylindrical parts of the rods, when said member is in its second position, and has a length sufficient for two consecutive ones of said rods in their second position to simultaneously engage said surface to hold said member in its second position without vibration.

2. The device according to claim 1 wherein said member is pivotally mounted for movement between its first and second positions.

3. The device according to claim 1 wherein said member is mounted for a parallel translational movement between its first and second positions.

4. The device according to claim 1 wherein said rods are uniformly cylindrical along their entire lengths.

5. The device according to claim 1 wherein said cylindrical parts of the rods are rotatable about the axes of said rods upon engagement with said surface of the member.

6. A rotary mechanical switching device comprising: a rotatable disc-like support; a member mounted for movement in a plane parallel to said support between first and second positions; a plurality of rods carried by said support for rotation therewith, said rods being disposed parallel to the axis of rotation of said support and regularly spaced apart in a substantially circular configuration concentric to the axis of rotation; said rods being axially slidable relative to said support between a first position out of the parallel plane and the second position in which cylindrical parts of said rods intercept that plane; said member having a surface for tangential engagement with said rods in their second position, selectively to move said member from its first to its second position, and to hold said member in its second position in response to the rotation of said support; and means for selectively moving said rods between their first and second positions; wherein said support has two operative faces and carries two independent series of said rods, one of said series cooperating with a second member movable in a plane on one face of said support, and said other series of rods cooperating with a third member movable in another plane on the other face of said support.

7. A rotary mechanical switching device comprising: a rotatable disc-like support; a member mounted for movement in a plane parallel to said support between first and second positions; a plurality of rods carried by said support for rotation therewith, said rods being disposed parallel to the axis of rotation of said support and regularly spaced apart in a substantially circular configuration concentric to the axis of rotation; said rods being axially slidable relative to said support between a first position out of the parallel plane and the second position in which cylindrical parts of said rods intercept that plane; said member having a surface for tangential engagement with said rods in their second position, selectively to move said member from its first to its second position, and to hold said member in its second position in response to the rotation of said support; means for selectively moving said rods between their first and second positions; and means for setting said rods to one of their first and second positions at an angular location where said rods do not engage said member; and wherein said moving means includes a spring biasing each of said rods towards the one of their positions, and locks for selectively retaining said rods in the other of their positions; said setting means automatically setting said rods to the toerh position.

8. The device according to claim 7, wherein said locks are formed by blades for engaging recesses in said rods.

9. The device according to claim 7, further comprising selectively operable deflection means in the trajectory of parts of said locks to release the latter.

10. The device according to claim 7, further comprising electromagnetic release means through which parts of said locks can pass.

* * * * *